Jan. 16, 1951  F. T. KIMBALL  2,538,202
FOOD ARTICLE AND METHOD OF MAKING
Filed Feb. 10, 1949
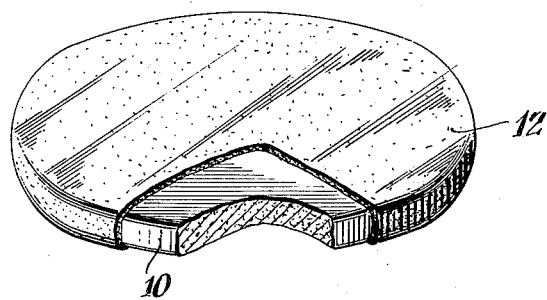
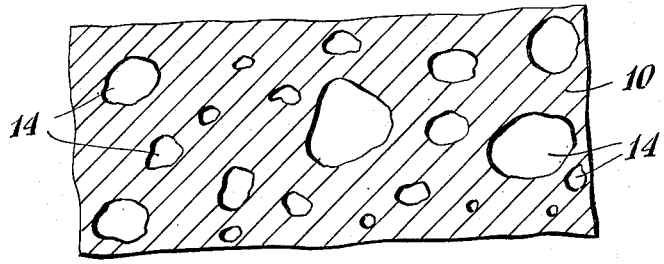
INVENTOR
Frank T. Kimball
BY
Robert Calvert
ATTORNEY Patented Jan. 16, 1951

2,538,202

UNITED STATES PATENT OFFICE 2,538,202

FOOD ARTICLE AND METHOD OF MAKING

Frank T. Kimball, South Norwalk, Conn., assignor to Orizar Products Inc., a corporation of New York Application February 10, 1949, Serial No. 75,580

7 Claims. (Cl. 99—138)

This invention relates to an article for consumption as human food and the method of making it.

The invention provides a complete food including essential minor ingredients, means for protecting those ingredients that are incompatible with others of the ingredients, and favorable synergistic effects between various ones of the several ingredients.

Briefly stated, the invention comprises a two-layer product of kind described, one layer enclosing the other. The inner layer includes a mixture of sucrose with an aqueous solution of another sugar, air whipped into this mixture as fine bubbles, and powdered solid protein dispersed in the resulting fondant and strengthening the interfaces between the bubbles of air and the liquid phase of the fondant. The outer layer contains a chocolate and sugar mixture and preferably also intimately admixed cocoa butter, a copper salt, vitamins A and D, edible lecithin, and wheat germ oil or other antioxidant. In the preferred embodiment, the article includes ascorbic acid along with cysteine and cystine serving as an oxidation-reduction buffer pair and protecting the ascorbic acid from loss of activity on aging in contact with the other ingredients. When the food is one which is to be the sole diet for a considerable time, then other essential ingredients are incorporated in minor proportions, as will be described later herein.

The invention comprises also the method of making the food article including the melting of sucrose with the selected other sugar in the form of an aqueous syrup, whipping and cooling the resulting fondant to a temperature not above about 100° F., then stirring in thoroughly the powdered protein, and maintaining the mixture at all times after contact of the protein with the sucrose at a temperature not above 100° F. to any substantial extent. This cooling before the incorporation of the powdered solid protein prevents the loss of lysine value of the protein in contact with the sugar that occurs at higher temperatures of contact.

The protein admixed in solid form concentrates somewhat in the interfacial zones between the bubbles of air introduced by the whipping process and the liquid phase and thus strengthens and stabilizes the fondant.

The cysteine and cystine pair, under the influence of oxidizing and reducing conditions as they develop, shifts in this manner

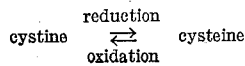

and thus buffers these conditions so as to protect the ascorbic acid from either oxidation or reduction.

The separation of the copper salt from the protein in different layers prevents catalysis, that would otherwise be caused by copper, of oxidation in the protein and sugar mixture. The separation reduces browning and development of off-color flavor which otherwise would be objectionable in a composition including a copper salt, sucrose and protein.

In addition, the various ingredients coact to mask the undesirable flavors that have heretofore prevented the public acceptance of a complete food in concentrated form such as described herein. The present product compounded in the manner stated is not only edible and wholesome but also of appealing and appetizing taste.

The invention will be illustrated in further detail by description in connection with the attached drawings to which reference is made.

Fig. 1 is a perspective view of the improved food article partly broken away for clearness of illustration.

Fig. 2 is a magnified fractional view of the inner layer of the article shown in Fig. 1.

There are shown a food article including inner layer 10 and outer layer 12. Within the inner layer are dispersed fine bubbles of air 14.

The inner or fondant layer 10 contains sucrose incorporated suitably as the powdered or confectioners' cane or beet sugar.

This layer includes also an aqueous and normally syrupy solution of a sugar selected from the group consisting of dextrose, levulose and invert sugar. This solution is preferably corn syrup or honey, the honey being suitably diluted with water to about the consistency of corn syrup before the mixture is formed. Depending upon the kind of beater available, the corn syrup and also the honey before use may be diluted to a somewhat lower viscosity by the incorporation of an additional proportion of water. When corn syrup is used, it may be the usual commercial syrup or a solution of like total solids content made by dissolving dried starch conversion syrup solids in water, as in the proportion of about 75 to 80 parts of the solids to 100 parts total weight of the resulting syrup. The dextrose equivalent of the syrup or said solids should be about 30% to 80% of reducing sugars calculated as dextrose on the dry basis.

As the protein used there is chosen one that is of bland, satisfactory taste. Examples are milk proteins, powdered egg white, or wheat gluten.

In any case the protein should be used in powdered form.

The cysteine and cystine pair may be added as the amino acids or as essential components of one of the other ingredients, as, for example, a mixture of lactalbumin and casein.

The various vitamins used may be supplied in the form of usual commercial concentrates.

Minor ingredients to be incorporated for a complete dietary product include salts of sodium, chlorine, iodine, calcium, cobalt, copper, iron, magnesium, manganese, potassium, and zinc. The salts and in fact all ingredients must be non-toxic in the proportions used and must be assimilable to a substantial extent in the alimentary canal.

Thus the various metals that are to be used may be in the form of a phosphate, pyrophosphate, citrate, carbonate, or other salt. Salts that are insoluble in water but soluble in the acidity of gastric juice are preferred because of minimized migration on long storage of the product and satisfactory assimilation in use. Iodine and potassium may be used in combination with each other as in iodide, additional potassium may be incorporated in the form of the chloride, and sodium may be and to advantage is added as common salt.

The lecithin and the wheat germ oil used are the commercial edible varieties. In place of the wheat germ oil, there may be used some other antioxidant, as, for instance, oat or wheat flour.

Choline is preferably incorporated into one of the two layers, suitably the inner layer, as a supplier of methyl groups in the metabolic processes to which the food is subjected after consumption.

Nuts and dried fruits may be incorporated for food value and flavor.

As to proportions, the fondant of the inner layer should contain more sucrose than other sugar. Also the sucrose should be in excess of the protein. The proportion of protein is suitably 50 grams for the food in amount to have an energy equivalent of 900 to 1,500 calories.

The minor ingredients, such as the salts and vitamins, are incorporated in physiologic proportions, that is, in accordance with the proportions of them which are known to be about the optimum in human nutrition, that is, so that a day's intake of the food of calorific value 2,000 to 3,000 will contain the needed quantities of the minor ingredients.

Preferred proportions of these several ingredients are illustrated in the tables below.

*Fondant layer*

| Ingredient | Parts by weight |
| --- | --- |
| Sucrose | 100. |
| Starch conversion syrup solids, dextrose, levulose, or invert sugar (dry basis). | 10-40. |
| Water | In amount to give viscous syrup with above "solids" etc. |
| Powdered protein | 20-80. |
| Cysteine | 1%-2% of protein. |
| Cystine | 0.5-1.5% of protein. |
| Ascorbic acid | 0.02-0.05 part. |
| Thiamine chloride, riboflavin and metal salts. | Physiological proportions. |
| Sodium chloride | To suit taste. |

The particular proportions of the salts and other minor ingredients are not a part of the present invention. The proportions in which they are known to be necessary or best in a diet for sustained use are already known. Thus I may use these minor ingredients in amounts ranging from 0.0001 part of zinc phosphate up to 1 part of potassium chloride.

In the enrobing or surrounding outer layer, the proportions of the major ingredients are those that are usual in the outer coatings of chocolate cream candy, chocolate coated wafers, or the like. Suitable proportions are shown in the following table:

*Enrobing layer*

| Ingredient: | Parts by weight |
| --- | --- |
| Chocolate liquor, commercial | 20-40 |
| Sucrose | 30-65 |
| Cocoa butter | 15-50 |
| Total | 100 |

Into the enrobing material there is incorporated the selected minor ingredients. Among those that are suitable are lecithin in the proportion of 0.5-3 parts, a copper salt 0.001-0.03, and an antioxidant such as wheat germ oil 0.3-2, all for 100 parts of the enrobing composition. Vitamins A and D are incorporated in physiologic proportions.

In making the improved food article, usual methods of compounding the fondant and then encasing it within the enrobing composition are followed with one exception. This exception is maintaining the composition containing the protein in contact with sucrose at all times at a temperature not above about 100° F.

The sucrose and selected additional sugar syrup or honey is melted with the water present in the syrup or water added separately if necessary to give the syrupy consistency. This melting is effected to advantage at about 220°-260° F. Then the melted material is cooled. During cooling, the melt is whipped vigorously, to incorporate minute bubbles of air and leave a creamy product. After the product has been cooled to a temperature not above 100° F. by a substantial amount, the protein powder is introduced with vigorous agitation. The other ingredients of the inner layer are incorporated in the fondant so made.

The enrobing composition is mixed separately, as at a temperature of about 104° to 110° F., is sent through enrober or finishing rolls of usual type and applied over the fondant in predetermined masses and shapes, the application being effected in conventional equipment. Thus the finished shape may be that of a chocolate cream, a chocolate mint, the usual type of chocolate bar, or a wafer. In any case the enrobing composition is applied at a temperature below that which would heat the interior layer or fondant to a temperature substantially above 100° F., this temperature being critical for reasons stated.

The products so made are satisfactory in taste, appearance, and nutritive value for use as the sole diet for human consumption when supplemented by additional water. The food may be supplemented by the intake of a small amount of common foods containing vitamins other than the major ones listed above. The method of manufacture is convenient and dependable in operation and the cost of the mechanical steps of compounding and shaping the ingredients is low.

The term "fondant" is used herein to include other mixtures of the ingredients of the inner layer that are intimate and that may be made by a melting and stirring process either with or without the addition of water. Such other forms that may constitute the inner layer are nougat, caramel or sponge containing the ingredients described above.

In making a dense product, the whipping in of air may be omitted. In this case, the air introduced and present in the finished product is incidental to the manufacturing steps.

It will be understood that it is intended to cover all changes and modifications of the examples of the invention herein chosen for the purpose of illustration which do not constitute departures from the spirit and scope of the invention.

What is claimed is:

1. A food article including (1) an inner layer comprising a creamy fondant mixture of sucrose, an aqueous syrupy solution of a sugar selected from the group consisting of dextrose, levulose, and invert sugar, air in the form of fine bubbles, and powdered protein dispersed in solid form in the fondant and somewhat concentrated in the interfaces between the bubbles of air and the liquid phase in the fondant and (2) an outer layer that is solid at room temperatures and comprises chocolate and sucrose in intimate admixture.

2. A food article including (1) an inner layer comprising a creamy mixture of sucrose, an aqueous syrupy solution of a sugar selected from the group consisting of dextrose, levulose, and invert sugar, ascorbic acid, cysteine and cystine serving as an oxidation-reduction buffer pair and thus protecting the ascorbic acid, and powdered protein dispersed in solid form in the creamy mixture and (2) an outer enrobing layer that is solid at room temperatures and comprises chocolate and sucrose in intimate admixture.

3. An article as described in claim 2, the inner layer containing also a non-toxic iron salt and the outer layer containing also admixed cocoa butter, an antioxidant, and admixed vitamins A and D.

4. An article as described in claim 3, the said syrupy solution being corn syrup.

5. An article as described in claim 2, the inner layer containing also a non-toxic iron salt and the outer layer containing also admixed cocoa butter, an antioxidant, a copper salt, and edible lecithin.

6. A food article including (1) an inner layer in the form of a creamy fondant comprising materials in proportions by weight as follows: sucrose 100 parts, starch conversion syrup solids 10–40, powdered protein 20–80, cysteine and cystine 1–3% and 0.5%–1.5% respectively, of the weight of the protein, ascorbic acid, thiamine chloride, riboflavin, niacinamide, and non-toxic salts of sodium, iron, potassium, manganese, magnesium, potassium, cobalt, iodine, zinc and calcium and (2) an outer, or enrobing layer containing the following ingredients in the proportions shown by weight: chocolate liquor 20 to 40 parts, sucrose 30 to 60, cocoa butter 20 to 50, added vitamins A and D, a non-toxic copper salt, edible lecithin, and wheat germ oil, the said fondant including dispersed fine bubbles of air and the powdered protein being somewhat concentrated in the interfaces between the bubbles of air and the remainder of the fondant.

7. The method of making a food article which comprises melting together sucrose and an aqueous syrupy solution of a sugar selected from the group consisting of dextrose, levulose, and invert sugar, cooling and whipping air into the melted product, and then intimately admixing a powdered protein and maintaining the mixture at all times when the protein and sucrose are in contact at a temperature not above about 100° F., to give a fondant, then forming a warm mixture of sucrose and chocolate liquor and applying the said mixture over the fondant at a temperature of the latter not above about 100° F., and causing the 2-layer article thus formed to cool to room temperature.

FRANK T. KIMBALL.

REFERENCES CITED

The following references are of record in the file of this patent:

UNITED STATES PATENTS

| Number | Name | Date |
| --- | --- | --- |
| 1,614,057 | Belcher | Jan. 11, 1927 |
| 1,781,636 | Gheynst | Nov. 11, 1930 |
| 2,098,998 | Brinton | Nov. 16, 1937 |
| 2,176,086 | Logan | Oct. 17, 1939 |
| 2,456,937 | Gyorgy | Dec. 21, 1948 |

OTHER REFERENCES

"Retardation of Rancidity by Sulfhydryl Compounds," Science, Dec., 1943, vol. 98, No. 2554, pages 518–520.